United States Patent [19]

Kadota et al.

[11] Patent Number: 4,552,904

[45] Date of Patent: Nov. 12, 1985

[54] RIGID THERMOPLASTIC RESIN FOAM AND PROCESS FOR PREPARATION THEREOF

[75] Inventors: Takao Kadota, Kanuma; Masayuki Hashimoto; Itsuo Hamada, both of Suzuka, all of Japan

[73] Assignee: The Dow Chemical Company, Midland, Mich.

[21] Appl. No.: 717,268

[22] PCT Filed: Jul. 20, 1983

[86] PCT No.: PCT/JP83/00232

§ 371 Date: Mar. 19, 1985

§ 102(e) Date: Mar. 19, 1985

[87] PCT Pub. No.: WO85/00553

PCT Pub. Date: Feb. 14, 1985

[30] Foreign Application Priority Data

Jan. 25, 1982 [JP] Japan .................................. 57-8838

[51] Int. Cl.$^4$ ............................................. C08J 9/36
[52] U.S. Cl. ..................................... 521/145; 264/51; 264/321; 264/DIG. 4; 264/DIG. 15; 521/79; 521/146; 521/147; 521/148; 521/180; 521/918
[58] Field of Search ................. 521/79, 145, 146, 147, 521/148, 180; 264/51, 321

[56] References Cited

U.S. PATENT DOCUMENTS 4,510,268  4/1985  Tonokawa et al. ................. 521/144

OTHER PUBLICATIONS

"Manufacture and Properties of Super-Light Polystyrene Foam", by G. Shuur, British Plastics, Apr. 1965, pp. 219-223.

Primary Examiner—Morton Foelak
Attorney, Agent, or Firm—Armstrong, Nikaido, Marmelstein & Kubovcik

[57] ABSTRACT

The foam of the present invention, which has a multicellular structure including many wrinkles having one end in the boundary portion where at least three cells are adjacent to one another and extending toward the central portion of the cell wall, is a rigid thermoplastic resin foam having an ultra-low density, a high sound-insulating property, a high heat-insulating property and a high flexibility, and it is suitable for adaption for building construction. The process of the present invention is to provide the aforesaid foam of the present invention by subjecting the foam of a rigid thermoplastic resin to expansion, contraction and aging.

1 Claim, 11 Drawing Figures

RIGID THERMOPLASTIC RESIN FOAM AND PROCESS FOR PREPARATION THEREOF

TECHNICAL FIELD

The present invention relates to a foam of a rigid thermoplastic resin, which has an ultra-low density, a high flexibility, a high sound-insulating property and a high heat-insulating property, and also to a process for the preparation of this foam.

BACKGROUND ART

Heretofore, rigid thermoplastic resin foams have been widely used as heat-insulating materials for ordinary houses and other buildings because of such excellent properties as a low head conductivity, a low water-absorbing property, a light weight and a good processability. However, since these foams are poor in the flexibility and have a large compression set, for example, when these foams are filled between pillars in buildings, it is necessary to cut the foams into a size corresponding to the distance between the pillars and fix the cut foams by special metal fittings. Practically, deviations of the distance between the pillars are not compensated, the operation efficiency is very low, and an air-tight, heat-insulating structure cannot be obtained. Furthermore, since they are rigid, a large force is necessary for filling the foams air-tightly, and application of a large force results in breakage of cells. Moreover, it happens that even the foams per se are broken, and an air-tight, heat-insulating structure cannot be obtained.

Recently, the heights of houses and buildings are increased, and especially in such buildings as multi-storied apartment houses, a high sound-insulating property is required between two adjacent stories. In order to solve this problem, there has recently been adopted a floating floor construction method in which an inorganic fiber board is arranged on a floor base and a concrete mortar is deposited on the inorganic fiber board through a waterproof layer. According to this method, the flexibility of the inorganic fiber board is utilized and solid-propagative sounds between upper and lower stories are reduced, and the sound-insulating property can be enhanced. When the conventional rigid thermoplastic resin foams are used in this method, since they are rigid, no sufficient sound-insulating property can be obtained.

As means for eliminating the foregoing disadvantages, there has recently been proposed a foam obtained by mechanically softening a polystyrene foam having a reduced density. In this foam, however, if the density is lower than 20 Kg/m$^3$, the resin wall defining cells is broken by the mechanical softening treatment, and a so-called communicating phenomenon takes place. Furthermore, even if breakage of cells in a relatively thick surface layer of the foam is controlled and an apparent closed cell ratio judged from the water absorption determined by an ordinary measuring method is maintained, cells which are present in the interior of the foam and composed of a wall thinner than the wall of the surface layer are broken, and the foam is inferior in the heat-insulating property and the maintenance of the heat-insulating property for a long time and the temperature dependency of the heat-insulating property increases. Furthermore, if the mechanical softening treatment is carried out, the foam as a whole is softened, and microscopically, the cells of the foam include softened and unsoftened portions and the physical properties of the foam are not uniform in the thickness direction or plane direction of the foam.

Plates or molded articles obtained by blowing foamable particles containing a foaming agent several times separately and finally effecting blowing in a mold are used as heat-insulating, shock-absorbing or sound-insulating materials. However, in a foam having a low density (a high blowing ratio) which is obtained by increasing the frequency of the operation of blowing the particles, since the size of the particles per se is increased, air-tight filling is impossible when a molded article is formed, and the fusion bonding among the particles is weak in the obtained foam. In order to obtain a strong fusion bonding, it is necessary to perform compressive filling and compressive molding when a molded article is formed, and the obtained foam is free of wrinkles referred to in the present invention and is poor in the flexibility and sound-insulating property. Accordingly, in the above-mentioned method, reduction of the density is restricted and the density of a foam that can be put into practical use is 17 Kg/m$^3$ or higher.

However, it has long been desired in the market to develop a rigid thermoplastic resin foam having a low density, a high flexibility and a good heat-insulating property, where the heat-insulating property is maintained for a long time, the temperature dependency of the heat-insulating property is small, the sound-insulating property is good and the compression set is reduced.

DESCRIPTION OF THE INVENTION

The present invention has been completed as the results of researches made in view of the above circumstances. The present invention provides a novel and progressive foam having excellent properties not possessed by the conventional heat-insulating, shock-absorbing or sound-insulating materials.

More specifically, the present invention provides a foam obtained by foaming a rigid thermoplastic resin, said foam having a density (D) of $3 \text{ Kg/m}^3 \leq D \leq 17 \text{ Kg/m}^3$, a multi-cellular structure including many wrinkles having one end in the boundary portion where at least 3 cells are adjacent to one another and extending toward the central portion of the cell wall, an average cell diameter (A) of $A \leq 2.0$ mm, a closed cell ratio (B) of $B \geq 50\%$, a kinetic spring constant (K) of $K \leq 40 \times 10^6 \text{ N/m}^3$, and a minimum value (C), among 60% compression set values determined with respect to three directions rectangular to one another, of $C \leq 25\%$.

Furthermore, according to the preparation process of the present invention, a high permeability of water vapor through a resin is utilized and the temperature dependency of the permeability of gases through the resin is combined with the softening point of the resin, whereby is obtained a rigid thermoplastic resin foam having an ultra-low density and a high flexibility, in which a high heat-insulating property is maintained for a long time, the sound-insulating property is excellent and the compression set is reduced.

More specifically, in accordance with another aspect of the present invention, there is provided a process for the preparation of a rigid thermoplastic resin foam, which comprises heating a foam of a rigid thermoplastic resin for at least 1 minute in hot water maintained at a temperature higher than 85° C. or water vapor atmosphere maintained at a temperature higher than 85° C. to expand the foam, then contracting the foam so that the volume is reduced to less than 70% of the volume of the final foam, and aging and expanding the foam in a drying chamber at an ambient temperature (T) of 40° C. $\leq T<$ the softening point of the resin for at least 24 hours, whereby is obtained a foam having a density (D) of 3 Kg/m$^3 \leq$ D $\leq$ 17 Kg/m$^3$, a multi-cellular structure including many wrinkles having one end in the boundary portion where at least 3 cells are adjacent to one another and extending toward the central portion of the cell wall, an average cell diameter (A) of A$\leq$2.0 mm, a closed cell ratio (B) of B$\geq$50%, a kinetic spring constant (K) of K$\leq$40$\times$10$^6$N/m$^3$, and a minimum value (C), among 60% compression set values determined with respect to three directions rectangular to one another, of C$\leq$25%.

The present invention will now be described in detail with reference to the accompanying drawings.

The first structural requirement of the present invention is that the density (d) of the rigid thermoplastic resin foam is in the range of 3 Kg/m$^3 \leq$ D $\leq$ 17 Kg/m$^3$ and the rigid thermoplastic resin foam has a multi-cellular structure including may wrinkles having one end in the boundary portion where at least three cells are adjacent to one another and extending toward the central portion of the cell wall.

A conventional rigid thermoplastic resin foam ordinarily has a high density and is free of wrinkles referred to in the present invention, and it is inferior in the flexibility. Even if the density is low in the conventional foam, since there are not wrinkles referred to in the present invention, when a load is once absorbed in the foam, cells in the foam are broken, with the result that a large compression set is brought about and the recovery property is insufficient. Furthermore, when the conventional rigid thermoplastic resin foam is filled uner compression between pillars of a building, a large compressive force is necessary, and the compression filling by the manual operation is difficult and the operation efficiency is very low. Moreover, the foam per se is broken by the compressive force applied for the compression filling, and not only the shock-absorbing property, but also the heat-insulating property is readily degraded.

In contrast, by dint of the above-mentioned ultra-low density and the presence of the wrinkles, the foam of the present invention can be filled with a small compressive force and since the stress generated at the compression filling is absorbed by the wrinkles, the filling operation can be accomplished without breakage of the cellular structure of the foam. Moreover, even if a load is imposed on the foam, the load is absorbed by the wrinkles and the compression set is small, and therefore, the foam has an excellent recovery property and can resist repeated use. Furthermore, both the shock-absorbing property and the heat-insulating property can be maintained at high levels for a long time.

For further clarification of the significance of the presence of the wrinkles and the manner of the arrangement of the wrinkles, FIG. 1 includes an enlarged photo showing the cellular structure of the foam of the present invention and an enlarged photo showing the cellular structure of a comparative foam which is mechanically wrinkled.

In the foam of the present invention shown in FIG. 1-(a), it is seen that the cell wall is thin, and there are present many wrinkles having one end in the boundary portion where at least three cells are adjacent to one another and extending toward the central portion of the cell wall. In contrast, in the mechanically wrinkled foam shown in FIG. 1(b), there are present wrinkles extending in the ribbon-like form and there are observed a wrinkle-present portion and a wrinkle-free portion. This feature has significant influences on the flexibility and compression set. In view of the foregoing, it is understood that the above-mentioned density and wrinkle structure are necessary in the foam of the present invention.

Even if the density is in the range specified in the present invention and the wrinkle structure is as defined in the present invention, an intended foam cannot be obtained unless the requirements of the average cell diameter (A) of A$\leq$2.0 mm and the closed cell ratio (B) of B$\geq$50% are satisfied. The reasons will be described below.

If the average cell diameter (A) is in the range of 2.0 mm$<$A, the convection of gas in the cells becomes large and the heat-insulating property is drastically reduced. If the closed cell ratio (B) is in the range of B$<$50%, the water absorption of the foam increases and the degradation of the heat-insulating property due to the absorption of water is increased, and since the maintenance of the heat-insulating property is insufficient, the foam cannot be practically used as a heat-insulating material. It is preferred that the closed cell ratio be in the range of B $\geq$70%.

Moreover, even if the above-mentioned density, wrinkle and cellular structure requirements are within the scope of this invention, the foam of the present invention necessitates that the kinetic spring constant (K) should be in the range of K$\leq$40$\times$10$^6$ N/m$^3$ and the minimum value (C), among 60% compression set values determined with respect to three directions rectangular to one another, should be in the range of C$\leq$25%. The reasons will be described below.

As pointed out hereinbefore, in such a building as a multi-storied apartment house, there is adopted a floating floor construction method in which a floor is boarded through a shock-absorbing material so as to reduce noises generated by shocks given to the floor between upper and lower stories, and the sound-insulating effect attained by this method is highly evaluated. FIG. 2 is a sectional view of a main part of a floor, which illustrates an example of the floating floor construction method. In this case, the sound-insulating property of the floating floor is mainly determined by the natural frequency (kinetic spring constant) of the floating floor system and the thickness of a floor body 1. More specifically, in order to damp vibrations generated by a large impact force on the floor by a sound-insulating material (shock-absorbing material) 2 for preventing the vibrations from being directly propagated to the floor body, it is necessary that the kinetic spring constant of the floating floor system should be reduced. It is considered that it is ordinarily preferred that the kinetic spring constant of the floating floor system be smaller than 30$\times$10$^6$ N/m$^3$, and the smaller is the value of the kinetic spring constant, the higher is the effect. The kinetic spring constant of the floating floor system is determined by the kinetic spring constant of the sound-insulating material 2 and the weight (plane density) of a floor board 3 of pressing concrete or the like. When a practical floating floor is taken into consideration, the plane density of the floor board is controlled in the range of 50 to 300 Kg/m$^2$ in view of the rigidity and from the economical viewpoint. In this case, in order to maintain the kinetic spring constant of the floating floor system at a level lower than 30$\times$10$^6$ N/m³, it is indispensable that the kinetic spring constant of the sound-insulating material, determined according to the measuring method described hereinafter, should be $40\times10^6$ N/m³ or less (when the thickness is 5 cm and the plane density is 250 Kg/m²). A foam having a 60% compression set exceeding 25% is defective in that by a stress generated, for example, in the step of filling the foam under compression between pillars, cells are broken or the foam is chipped. The reason why the minimum value among compression set values determined with respect to three directions rectangular to one another is specified in the present invention is that in the foam of the present invention, the flexibility-requiring direction may differ according to the intended use. Ordinarily, it is preferred that the flexibility be substantially equal in all the directions.

The above-mentioned foam of the present invention is a novel foam which heretofore has not been provided at all. If the foam of the present invention is laminated with a plastic board, a plastic film, a wood board, an inorganic material or a cloth according to need, a product excellent in the strength, heat-insulating property and sound-insulating property can be obtained and high effects can be attained by this product.

As for the preparation process according to the present invention, at first, a rigid thermoplastic resin foam preferably having a density lower than 200 Kg/m³, more preferably lower than 100 Kg/m³, is heated for at least 1 minute in hot water maintained at a temperature higher than 85° C. or in a water vapor atmosphere maintained at a temperature higher than 85° C. The hot water of more than 85° C. naturally includes a system such as a hot water of 100° C. in which steam and liquid water coexist.

The above-mentioned heating condition is critical because if the temperature of hot water or the water vapor atmosphere is lower than 85° C., the density of the foam is hardly changed (reduced) even by conducting the heating for a long time. This condition will now be described with reference to FIGS. 3 and 4.

An extrusion-foamed polystyrene plate having an initial density of 34 Kg/m³ and a thickness of 15 mm is placed in a steam chamber, the density is reduced while measuring the ambient temperature, the foam is recovered according to the process of the present invention, and the density of the final foam is measured. The obtained results are plotted on a graph in FIG. 3. This graph shows that when blowing is effected in a steam atmosphere maintained at 83° C., even if the heating is effected for a long time, the density of the foam is hardly changed, but when the temperature is higher than 85° C., the density of the foam is reduced with the lapse of heating time. It is ordinarily sufficient if the heating is conducted at a temperature higher than 85° C. for at least 1 minute. However, the heating time is changed according to the material of the foam and the thickness of the foam before the heating, but from the industrial viewpoint, it is ordinarily preferred that the heating time is up to 60 minutes. FIG. 4 is a graph showing the densities of final foams obtained when the same foam as described above is heated by using air maintained at 90° C., hot water maintained at 90° C. and water vapor maintained at 90° C. as the heat source. This graph shows that reduction of the density of the foam is caused in hot water or water vapor but the density is hardly reduced in air. In view of the foregoing, in the process of the present invention, it is indispensible that the heating should be conducted in hot water or water vapor maintained at a temperature higher than 85° C. for at least 1 minute, preferably up to 60 minutes.

After the above-mentioned heat treatment, the foam should once be contracted so that the volume of the foam is reduced to less than 70% of the volume of the final foam (Although the volume just after the heating and blowing treatment should be used for the comparison, the volume of the final foam is used for the comparison in the present invention because if the foam is placed in air just after the heating, contraction takes place and the measurement of the size is very difficult, and the measured value per se is inaccurate). The reason for this contraction will now be described.

If the volume of the foam which is contracted after the heating and blowing treatment exceeds 70% of the volume of the final foam, that is, if the degree of the contraction is maintained at a low level, wrinkles are not formed on the cell wall, or they are not uniform throughout the foam even if wrinkles are formed, and a foam having the intended properties cannot be obtained. According to the above-mentioned density-reducing method adopted at present, foamable particles containing a foaming agent are heated and blown several times separately and the foam is further blown in a mold so that the size of the foam after the blowing is not substantially changed, whereby a plate or molded article is obtained. Accordingly, the foam obtained according to this conventional method does not substantially contain wrinkles referred to in the present invention. This will become more apparent from FIG. 5 including a photograph (a) of the cellular structure of the foam obtained according to the process of the present invention and a photograph (b) of the cellular structure of the foam obtained by heating and blowing the particles several times (three times) separately so that contraction does not take place. In the product of the present invention shown in (a), there are present many wrinkles having one end in the boundary portion where at least three cells are adjacent to one another and extending toward the central portion of the cell wall, but the comparative product shown in (b) does not contain wrinkles referred to in the present invention.

In the process of the present invention, it is indispensable that the foam which has thus been once contracted should be aged in a drying chamber maintained at an ambient temperature (T) of 40° C.$\leq$T<the softening point of the resin, preferably at the relative humidity lower than 30%, more preferably lower than 10%, for at least 24 hours. The reason for this condition will now be described.

If the temperature (T) of the recovering atmosphere is lower than 40° C., as shown in FIG. 6, a long time is necessary for the recovery and the process becomes industrially disadvantageous. This will also be apparent from FIG. 7 showing a curve of the gas permeation of air through polystyrene. Namely, if the temperature is 40° C. or higher, the amount of air permeating through polystyrene is increased, and the recovery speed of the foam is increased. If the foam is heated at a temperature higher than the softening point of the resin, the resin melts simultaneously with the recovery, and no foam can be obtained. If the relative humidity is high, substitution of water in the contracted foam with air is hardly advanced, and if the foam is taken out from the heating atmosphere after the recovery operation, contraction takes place again and it is difficult to obtain a foam excellent in the dimension stability. The aging time is determined according to the aging temperature and the intended density of the final foam. In the process of the present invention, the aging time should be at least 24 hours even in the case where a foam having a density of 17 Kg/m³ is obtained and the aging temperature is close to the softening point of the resin.

In the foregoing illustration, air is taken as an instance of the drying recovery atmosphere. In the present invention, instead of air, there may be used an inorganic gas such as carbon dioxide gas, helium or hydrogen, or a mixture of an organic gas with air according to the intended use. In the process of the present invention, in order to impart a good shape to the product, it is preferred to dispose an auxiliary plate in the heating and blowing step, the contracting step and the aging step.

In the case where a directional property is given to the physical properties of the foam, there may be adopted a method in which expansion in one or two of the lateral, longitudinal and thickness directions is controlled in a molding frame and expansion is freely allowed in the remaining one or two directions.

As the rigid thermoplastic resin referred to in the present invention, there can be mentioned styrene type polymers such as homopolymers of styrene, methylstyrene, ethylstyrene and chlorostyrene, copolymers of these alkenyl aromatic compounds with easily copolymerizable olefin compounds such as maleic anhydride, acrylic acid and methacrylic acid, rubber-reinforced polymers, acrylic polymers such as polyacrylonitrile, polymethyl methacrylate and an acrylonitrile-butadiene-styrene copolymer, polycarbonates, polyphenylene oxides, rigid vinyl chloride polymers, and mixtures of two or more of the foregoing polymers. The rigid thermoplastic resin foam means a foam obtained by extrusion-blowing, blowing in a mold or freely blowing the polymer or polymer mixture as described above by a chemical foaming agent, a physical foaming agent or a mixture thereof. Especially preferred is a so-called extruded foam obtained by melt-kneading the aforesaid styrene type polymer with a physical foaming agent, a chemical foaming agent or a mixture thereof in an extruder and extruding the melt through a T-die or an annular die. A foam obtained by blowing and fusion bonding foamable particles in a mold to form a plate or other molded articles is included in the scope of the foam in the present invention, but fusion bonding of the particles is insufficient more or less and the heat-insulating property of this foam is inferior to that of a foam obtained by extrusion blowing or blowing in the form of a sheet. The shape of the rigid thermoplastic resin foam used in the process of the present invention is not particularly restricted, but a foam having a plate-like shape, a square pillar-like shape or a sheet-like shape is advantageously used. In order to maintain the precise dimension of the final foam, it is especially preferred that the thickness of the starting foam be smaller than 50 mm. Furthermore, the foam may incorporate therein ordinary additives such as a nucleating agent, a lubricant, a colorant, an ultraviolet absorber, and an antistatic agent when necessary.

In the present invention, the density of the foam, the average cell diameter, the closed cell ratio, the kinetic spring constant, the 60% compression set, and the softening point of the resin are determined according to methods described below.

Density of Foam: JIS A-9511

Average Cell Diameter: According to the method of JIS K-6402, the cell diameter is measured with respect to each of the thickness direction of the foam and the lateral and longitudinal directions rectangular to the thickness direction on the same plane, and the mean value is calculated.

Closed-Cell Ratio: The closed-cell ratio is determined according to the measuring method of ASTM D-2856 (the value of open cells in the surface layer of the sample is included). Each surface of the sample is cut off in a thickness corresponding to 1/20 of the original thickness in a thickness direction to said surface, and the closed-cell ratio is determined again. This operation is repeated n times, and the mean value is calculated. Although the repetition frequency is preferred to be as large as possible, it is limited by the size of the original sample. Therefore, the repetition frequency n should be at least 3.

Kinetic Spring Constant: The kinetic spring constant is determined according to the following test method.
(i) Test Apparatus:
In this test apparatus, as illustrated in FIG. 8, a synthetic resin foam test piece 9 is placed on a platen 10, and a loading plate 11 is placed thereon. A frequency pick-up 12 connected to a wave form recording device 14 is arranged on the loading plate 11. An amplifier 13 is disposed between the wave form recording device 14 and the frequency pick-up 12.

(a) Size of Synthetic Resin Foam Test Piece 9:
500 mm × 500 mm × 50 mm (thickness)

(b) Platen 10:
The levelness is less than 1 mm, the inclination angle to the horizontal plane is within ±1°, and the platen has a sufficient effective mass.

(c) Loading Plate 11:
The levelness is less than 0.2 mm, the plate has a square shape having a side of 300 mm ± 3 mm, the mass is 22.5 Kg(=250 Kg/m²) with an error being within ±1%, and a harmful bending vibration is not caused.

(d) Frequency Pick-up 12
A pick-up having a weight as light as possible is used so that no influence is imposed on the damped oscillation.

(e) Frequency Wave Form Recording Device:
A device enabling the observation of the wave form of the natural frequency is used.
(ii) Measuring Method:
A rubber baseball is freely dropped onto the center of the loading plate 11 in the vertical direction from a height of about 0.8 m to cause vibration, and the wave form is observed.
(iii) Method for Calculation of Kinetic Spring Constant per Unit Area:
AT least 2 periods T (T₁, T₂, ... ) are read between adjacent peaks of a damped wave form 15 of the frequency which has become a free vibration as shown in FIG. 9, and the kinetic spring constant K per unit area is calculated from the mean value of the so-read periods according to the following equation:

$$K = \left(2\pi \frac{1}{Tn}\right)^2 \times m \ (N/m^3)$$

m = the mass of the load per unit area (250 Kg/m³)
Tn = the mean value (seconds) of the natural periods
60% Compression Set: According to the method of JIS K-6767.
Softening point of Resin: ASTM D-1525

The properties referred to in the present invention are evaluated according to the following methods and ratings.

SHOCK-ABSORBING PROPERTY

I-1. Shock-absorbing Property (1) (Compression Set)

Evaluation Method: According to JIS K-6767 (the compression creep test method), the 60% compression set is measured with respect to the thickness direction of the foam and two directions, that is, the longitudinal and lateral directions, rectangular to each other on the same plane and rectangular to the thickness direction, and the evaluation is made based on the minimum value (C).

Evaluation Rating:

| 60% Compression Set (C) (%) | Mark |
|---|---|
| 15 ≧ C | ⊚ |
| 15 < C ≦ 25 | ○ |
| 25 < C | X |

I-2. Shock-absorbing Property (2) (Kinetic Shock-absorbing Characteristic)

Evaluation Method: According to the method of JIS Z-0235 (evaluated under a static stress of at least 0.02 Kg/cm$^2$), the measurement is carried out at a thickness of 50 mm (if the thickness is smaller than 50 mm, test pieces are piled so that the thickness is increased to 50 mm), and the maximum deceleration rate (G) is determined when the falling is conducted 2 to 5 times, and the evaluation is made based on the mean value of this maximum deceleration rate. The case where the static stress is smaller than 0.02 Kg/cm$^2$ is indicated by the mark (X).

Evaluation Rating:

| Maximum Deceleration Rate (G) | Mark |
|---|---|
| 40 ≧ G | ⊚ |
| 40 < G ≦ 60 | ○ |
| 60 < G | X |

I-3. Shock-absorbing Property (3) [Filling Processability (low compression stress characteristic)]

Evaluation Method: The stress under a 10% compression strain is measured with respect to the thickness direction of the foam and the two directions, that is, the longitudinal and lateral directions, rectangular to each other on the same plane and rectangular to the thickness direction, according to JIS K-6767 (the compression creep test method), and the evaluation is made based on the minimum value (P) among the values obtained with respect to the three directions.

Evaluation Rating:

| Compression Stress (Kg/cm$^2$) under 10% Strain | Mark |
|---|---|
| 1 ≧ P | ⊚ |
| 1 < P ≦ 2 | ○ |
| 2 < P | X |

I-4. Bending Deflection

Evaluation Method: According to the method of JIS A-9511, the test is carried out, and the evaluation is made based on the maximum deflection (y) determined according to the following equation:

$$y = \frac{P}{E} \cdot \frac{l^3}{4bh^3}$$

wherein,
P: maximum load (Kg)
l: span distance (cm)
b: width of the test piece (cm)
h: thickness of the test piece (cm)
E: flexural modulus (Kg/cm$^2$)
y: maximum deflection (cm)

Evaluation Rating:

| Maximum Deflection | Mark |
|---|---|
| 20 ≦ y | ⊚ |
| 20 > y ≧ 10 | ○ |
| 10 > y | X |

II. HEAT INSULATING PROPERTIES

II-1. Heat Conductivity

Evaluation Method: The heat conductivity (λ) at 0° C. is determined in unit of Kcal/m·hr° C. according to the method of ASTM C-518 and the evaluation is made based on the obtained value.

Evaluation Rating:

| Heat Conductivity (Kcal/m · hr °C.) | Mark |
|---|---|
| 0.033 ≧ λ | ⊚ |
| 0.033 < λ ≦ 0.043 | ○ |
| 0.043 < λ | X |

II-2. Temperature Gradient of Heat Conductivity

Evaluation Method: In the same manner as in the case of II-1, according to the method of ASTM C-518, the heat conductivity is measured at two temperatures or more (15° C., 35° C. and 55° C. in the present invention), and the temperature gradient (X) of the heat conductivity is determined and the evaluation is made based on this temperature gradient.

Evaluation Rating:

| Temperature Gradient of Heat Conductivity | Mark |
|---|---|
| 2.7 × 10$^{-4}$ ≧ X | ⊚ |
| 2.7 × 10$^{-4}$ < X ≦ 3.3 × 10$^{-4}$ | ○ |
| 3.3 × 10$^{-4}$ < X | X |

III. SOUND-INSULATING PROPERTY

Evaluation Method: The measurement is carried out according to the floor shock sound level measuring method of JIS A-1418, and the evaluation is made according to the rating of the sound-insulating property to the floor shock sound, specified in JIS A-1419. A test specimen is fabricated by laying a plate-like foam having a thickness of 50 mm without any clearance on a building floor body of RC construction, applying a polyethylene film having a thickness of 100 microns onto the foam, applying a concrete mortar in a thickness of 50 mm onto the polyethylene film, aging for one week and placing a needle-punched carpet having a thickness of 3 mm on the concrete mortar, and the floor shock sound level is determined.

foams and the evaluation results are summarized in Table 1-2 and Table 1-3.

TABLE 1

| Sample foam No. | Example | | | | | | Comparative Example | | | | |
|---|---|---|---|---|---|---|---|---|---|---|---|
| | 1 | 2 | 3 | 4 | 5 | 6 | 7 | 8 | 9 | 10 | 11 |
| Kind of resin of used foam [Softening point (°C.)] | poly-styrene (105) | poly-styrene (105) | poly-styrene (105) | poly-styrene (105) | poly-styrene (105) | poly-styrene (105) | poly-styrene (105) | poly-styrene (105) | poly-styrene (105) | poly-styrene (105) | poly-styrene (105) |
| Preparation conditions | | | | | | | | | | | |
| Blowing conditions | | | | | | | | | | | |
| Heating medium | water vapor | water vapor | water vapor | hot water | hot water | hot water | water vapor | water vapor | hot water | hot air | hot air |
| Heating temperature (°C.) | 100 | 110 | 85 | 85 | 90 | 90 | 83 | 100 | 80 | 90 | 80 |
| Heating time (minutes) | 10 | 1 | 60 | 60 | 1 | 5 | 60 | 0.95 | 0.5 | 10 | 30 |
| Ratio (%) of volume of once-contracted foam to volume of foam after completion of aging | 37 | 70 | 64 | 44 | 58 | 55 | 80 | 84 | 90 | 68 | 110 |
| Aging conditions | | | | | | | | | | | |
| Temperature (°C.) | 75 | 75 | 75 | 75 | 75 | 75 | 75 | 75 | 75 | 75 | 75 |
| Time (hours) | 120 | 120 | 120 | 120 | 120 | 120 | 120 | 120 | 120 | 120 | 120 |
| Structure of obtained foam | | | | | | | | | | | |
| Density of foam (Kg/m$^3$) | 10.0 | 15.0 | 13.0 | 9.2 | 17.0 | 14.0 | 17.7 | 18.5 | 25.0 | 18.0 | 24.2 |
| Wrinkles extending to center of cell wall from joint portion of cell wall | present | present | present | present | present | present | present | absent | absent | present | absent |
| Average cell diameter of foam (mm) | 1.00 | 0.75 | 0.8 | 1.05 | 0.8 | 0.75 | 0.78 | 0.72 | 0.70 | 0.83 | 0.70 |
| Closed-cell ratio (%) | 82 | 89 | 92 | 90 | 95 | 90 | 92 | 92 | 98 | 89 | 92 |
| Kinetic spring constant (10$^6$ N/m$^3$) | 6.5 | 34.2 | 23.0 | 30.0 | 40.0 | 37.0 | 53.0 | 58.0 | 100 | 55.3 | 78.2 |
| Evaluation items | | | | | | | | | | | |
| Shock-absorbing property (1)(%) | 15 | 23 | 23 | 14 | 25 | 21 | 27 | 30 | 34 | 24 | 32 |
| Shock-absorbing property (2) | | | | | | | X | X | X | | X |
| Shock-absorbing property (3) | | | | | | | | | X | | |
| Bending deflection | | | | | | | | X | X | | X |
| Heat insulating property (1) | | | | | | | X | X | X | X | X |
| Heat insulating property (2) | | | | | | | | | | | X |
| Sound insulating property | | | | | | | X | X | X | X | X |

Evaluation Rating:

| Class of Sound-insulating Effect | Mark |
|---|---|
| above level L-50 | |
| below level L-50 but above level L-60 | |
| below level L-60 | X |

EXAMPLE 1 AND COMPARATIVE EXAMPLE 1

Polystyrene extruded foams having a thickness of 25 mm, a width of 400 mm, a length of 700 mm and a density of 22 to 28 Kg/m$^3$ were placed in a heating furnace, and the heating medium, heating temperature and heating time were changed as indicated in Table 1-1 while keeping the aging conditions constant. Namely, in each run, the aging was carried out in air maintained at 75° C. for 120 hours. The structures of the obtained

EXAMPLE 2 AND COMPARATIVE EXAMPLE 2

Extruded foams having a thickness of 15 mm, a width of 300 mm, a length of 500 mm and a density of 25 to 110 Kg/m$^3$ were placed in a heating furnace as in Example 1 and Comparative Example 1. The heating medium was limited to steam or hot water, and the heating temperature was adjusted to 90 or 100° C. and the heating was conducted for 15 or 30 minutes. The same aging conditions were adopted in all the runs (See Table 2-1). The ratio of the volume of the once-contracted foam to the volume of the foam after completion of the aging was examined. The structures of the obtained foams and the evaluation results are summarized in Table 2-2 and Table 2-3. As shown in Table 2-1, the used resins were polystyrene, polymethyl methacrylate and a styrene-methacrylic acid copolymer.

TABLE 2

| Sample foam No. | Example | | | | | Comparative Example | | | |
|---|---|---|---|---|---|---|---|---|---|
| | 12 | 13 | 14 | 15 | 16 | 17 | 18 | 19 | 20 |
| Kind of resin of used foam [Softening point (°C.)] | poly-styrene (105) | poly-styrene (105) | polymethyl methacrylate (103) | poly-styrene (105) | styrene/methacrylic acid copolymer (125) | poly-styrene (105) | styrene/methacrylic acid copolymer (125) | poly-styrene (105) | styrene/methacrylic acid copolymer (125) |
| Preparation conditions | | | | | | | | | |
| Blowing conditions | | | | | | | | | |
| Heating medium | water vapor | water vapor | water vapor | hot water | hot water | water vapor | water vapor | hot water | hot water |
| Heating temperature (°C.) | 100 | 100 | 100 | 90 | 90 | 100 | 100 | 90 | 90 |
| Heating time (minutes) | 15 | 15 | 15 | 30 | 30 | 15 | 15 | 30 | 30 |
| Ratio (%) of volume of once-contracted foam to volume of | 20 | 30 | 36 | 62 | 70 | 72 | 80 | 105 | 95 |

TABLE 2-continued

| Sample foam No. | Example | | | | | Comparative Example | | | |
|---|---|---|---|---|---|---|---|---|---|
| | 12 | 13 | 14 | 15 | 16 | 17 | 18 | 19 | 20 |
| foam after completion of aging | | | | | | | | | |
| Aging conditions | | | | | | | | | |
| Temperature (°C.) | 85 | 85 | 85 | 85 | 85 | 85 | 85 | 85 | 85 |
| Time (hours) | 96 | 96 | 96 | 96 | 96 | 96 | 96 | 96 | 96 |
| Structure of obtained foam | | | | | | | | | |
| Density of foam (Kg/m$^3$) | 3.3 | 5.0 | 8.5 | 7.2 | 15.1 | 16.3 | 17.3 | 26.0 | 28.0 |
| Wrinkles extending to center of cell wall from joint portion of cell wall | present | present | present | present | present | present | present | absent | absent |
| Average cell diameter of foam (mm) | 1.85 | 1.62 | 1.12 | 0.42 | 0.9 | 0.32 | 0.77 | 0.83 | 0.72 |
| Closed-cell ratio (%) | 50 | 53 | 62 | 68 | 92 | 23 | 48 | 60 | 90 |
| Kinetic spring constant (10$^6$ N/m$^3$) | 1.7 | 2.4 | 5.3 | 5.2 | 15.5 | 20.5 | 45.1 | 230 | 130 |
| Evaluation items | | | | | | | | | |
| Shock-absorbing property (1) (%) | 5.7 | 8.0 | 10.2 | 7.7 | 24 | 8.5 | 10.0 | 25 | 40 |
| Shock-absorbing property (2) | | | | | | | | X | X |
| Shock-absorbing property (3) | | | | | | | | | X |
| Bending deflection | | | | | | | | | X |
| Heat insulating property (1) | | | | | | X | X | X | X |
| Heat insulating property (2) | | | | | | X | X | | |
| Sound insulating property | | | | | | | | X | X |

EXAMPLE 3 AND COMPARATIVE EXAMPLE 3

Polystyrene extruded foams having a density of 22 to 28 Kg/m$^3$ and having the same size as that of the samples used in Example 1 and Comparative Example 1 were heated and blown under limited conditions (heating medium, heating temperature and heating time) and aged under various conditions (temperature and time) (See Table 3-1). The structures of the obtained foams and the evaluation results are summarized in Table 3-2 and Table 3-3. The used polystyrenes were two kinds differing in the softening point.

TABLE 3

| Sample foam No. | Example | | | | | | | Comparative Example | | | | |
|---|---|---|---|---|---|---|---|---|---|---|---|---|
| | 1 | 21 | 22 | 23 | 24 | 25 | 26 | 27 | 28 | 29 | 30 | 31 |
| Kind of resin of used foam [Softening point (°C.)] | poly-styrene (105) | poly-styrene (105) | poly-styrene (105) | poly-styrene (112) | poly-styrene (112) | poly-styrene (112) | poly-styrene (112) | poly-styrene (105) | poly-styrene (105) | poly-styrene (112) | poly-styrene (112) | poly-styrene (112) |
| Preparation conditions | | | | | | | | | | | | |
| Blowing conditions | | | | | | | | | | | | |
| Heating medium | water vapor | water vapor | hot water | water vapor | water vapor | hot water | hot water | water vapor | water vapor | water vapor | hot water | hot water |
| Heating temperature (°C.) | 100 | 100 | 90 | 110 | 110 | 90 | 100 | 100 | 100 | 110 | 90 | 90 |
| Heating time (minutes) | 10 | 10 | 20 | 5 | 5 | 20 | 20 | 10 | 10 | 5 | 20 | 20 |
| Ratio (%) of volume of once-contracted foam to volume of foam after completion of aging | 37 | 60 | 52 | 64 | 67 | 70 | 68 | 72 | 69 | 90 | 93 | 98 |
| Aging conditions | | | | | | | | | | | | |
| Temperature (°C.) | 75 | 85 | 75 | 105 | 110 | 60 | 75 | 75 | 100 | 115 | 55 | 58 |
| Time (hours) | 120 | 24 | 96 | 48 | 24 | 24 | 72 | 23 | 15 | 24 | 120 | 23 |
| Structure of obtained foam | | | | | | | | | | | | |
| Density of foam (Kg/m$^3$) | 10.0 | 15.1 | 12.7 | 13.0 | 11.8 | 16.8 | 13.0 | 17.1 | 17.6 | 25.3 | 19.8 | 23.2 |
| Wrinkles extending to center of cell wall from joint portion of cell wall | present | present | present | present | present | present | present | present | present | absent (dissolved) | present | present |
| Average cell diameter of foam (mm) | 1.0 | 2.0 | 0.93 | 0.75 | 1.3 | 1.5 | 1.7 | 0.82 | 1.72 | measurement impossible | 1.65 | 2.1 |
| Closed-cell ratio (%) | 82 | 52 | 90 | 62 | 50 | 93 | 92 | 93 | 88 | | 91 | 90 |
| Kinetic spring constant (10$^6$ N/m$^3$) | 6.5 | 20.1 | 34.4 | 21.8 | 7.3 | 40.0 | 38.0 | 42.0 | 39.7 | | 88.3 | 130 |
| Evaluation items | | | | | | | | | | | | |
| Shock-absorbing property (1) (%) | 15 | 10.5 | 22 | 17.0 | 7.0 | 24 | 23 | 26 | 26 | — | 30 | 31 |
| Shock-absorbing property (2) | | | | | | | | X | X | — | X | X |
| Shock-absorbing property (3) | | | | | | | | | | — | X | X |
| Bending deflection | | | | | | | | | X | — | X | X |
| Heat insulating property (1) | | | | | | | | X | X | — | X | X |
| Heat insulating property (2) | | | | | | | | | | — | | X |
| Sound insulating property | | | | | | | | X | | — | X | X |

EXAMPLE 4 AND COMPARATIVE EXAMPLE 4

In order to clarify that the foam of the present invention possesses all of the properties referred to in the present invention and where the foam of the present invention is characteristic over commercially available products, the following foamed plates were evaluated according to the evaluation methods described in the text. The evaluation results are summarized in Table 4-1 and Table 4-2.

Foams (representatives) of Present Invention: Sample Nos. 1, 15 and 22

Commercially Available Products:

| Mark | Name | Main Use | Maker |
| --- | --- | --- | --- |
| S | Glass Wool No. 2 | heat-insulating material, sound-insulating material | S Company |
| W | Woodrack | packaging material (fancy box) | Asahi-Dow Ltd. |
| X | Styrofoam | heat-insulating material | Asahi-Dow Ltd. |
| Y | Beads Board No. 2 | heat-insulating material | Y Company |
| Z | Beads Board | shock-absorbing material | Z Company |

-continued

| Mark | Name | Main Use | Maker |
| --- | --- | --- | --- |
|  | No. 3 |  |  |

TABLE 4

| | Material of product | Density of product (Kg/m$^3$) | Wrinkles extending to center of cell wall from joint portion of cell wall | Average cell diameter (mm) | Closed-cell ratio (%) | Kinetic spring constant (10$^6$ N/m$^3$) |
| --- | --- | --- | --- | --- | --- | --- |
| Product No. 1 of present invention | polystyrene | 10.0 | present | 1.0 | 82 | 6.5 |
| Product No. 15 of present invention | polystyrene | 7.2 | present | 0.42 | 68 | 5.2 |
| Product No. 22 of present invention | polystyrene | 12.7 | present | 0.93 | 90 | 34.4 |
| Commercial product S | glass wool | 20.0 | — | — | — | 1.0 |
| Commercial product W | polystyrene | 100.0 | absent | 0.40 | 95 | 130 |
| Commercial product X | polystyrene | 28.0 | absent | 0.75 | 98 | 110 |
| Commercial product Y | polystyrene | 30.0 | absent | 0.2 | 90 | 120 |
| Commercial product Z | polystyrene | 15.0 | absent | 0.3 | 83 | 65 |

| | Shock-absorbing property (1), mean value (%) of 60% compression set values 35 CH in three directions | Shock-absorbing property (2) (Value G) | Shock-absorbing property (3) (Kg/cm$^2$) | Bending deflection | Heat-insulating property (1) (Kcal/m · hr °C.) | Heat insulating property (2) (× 10$^{-4}$) | Sound-insulating property |
| --- | --- | --- | --- | --- | --- | --- | --- |
| Product No. 1 of present invention | 15 | 38 | 0.7 | 22 | 0.033 | 2.8 | |
| Product No. 15 of present invention | 7.7 | 35 | 0.5 | 30 | 0.035 | 3.0 | |
| Product No. 22 of present invention | 22 | 44 | 0.9 | 12 | 0.032 | 2.4 | |
| Commercial product S | 3.0 | — X | — | — | 0.038 | 100 X | |
| Commercial product W | 42 X | — X | 5.0 X | 2 X | 0.032 | 2.5 | X |
| Commercial product X | 38 X | 75 X | 3.5 X | 3.8 X | 0.029 | 1.3 | X |
| Commercial Product Y | 40 X | 80 X | 3.5 X | 3.2 X | 0.029 | 1.7 | X |
| Commercial product Z | 27 X | 70 X | 2.4 X | 5.3 X | 0.034 | 2.9 | X |

By dint of the above-mentioned characteristic structure, the present invention allows the foam to have a high flexibility, an excellent heat-insulating property, a good sound-insulating property and a reduced compression set, and the foam of the present invention can advantageously be used as a heat-insulating and sound-insulating material or a shock-absorbing material for a floor, wall or roof of buildings. Accordingly, the present invention is very advantageous from the industrial viewpoint.

BRIEF DESCRIPTION OF THE DRAWINGS

FIG. 1-(b) is an enlarged photograph showing the cellular structure of a comparative product.

FIG. 5-(b) is an enlarged photograph showing the cellular structure of a comparative product.

Figure 1A:
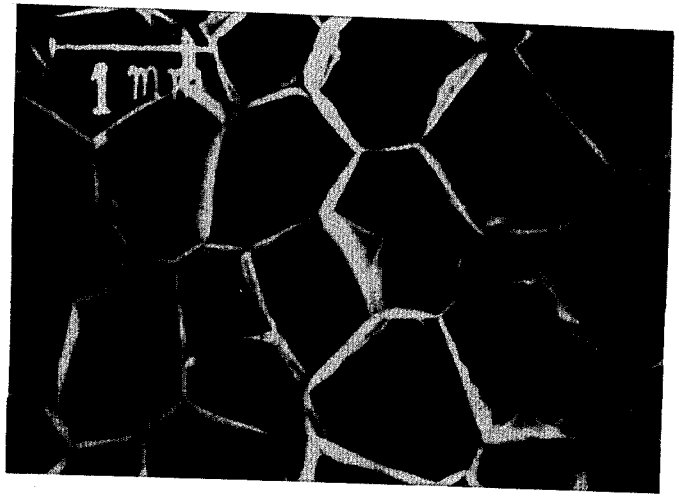
FIG. 1-(a) is an enlarged photograph showing the cellular structure of the product of the present invention.
Figure 1B:
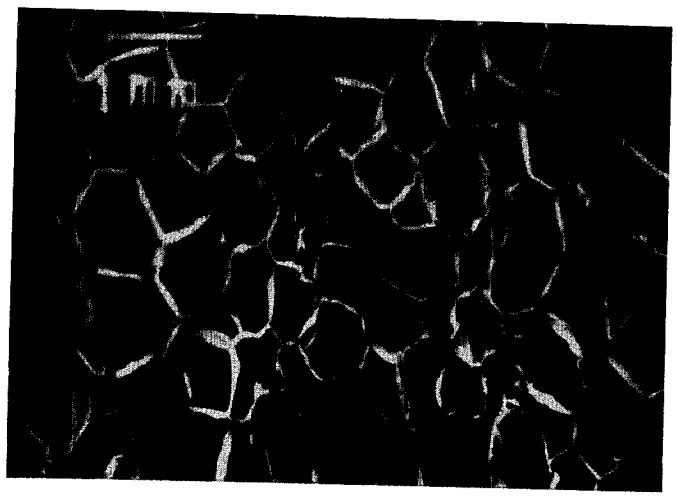
Figure 2:
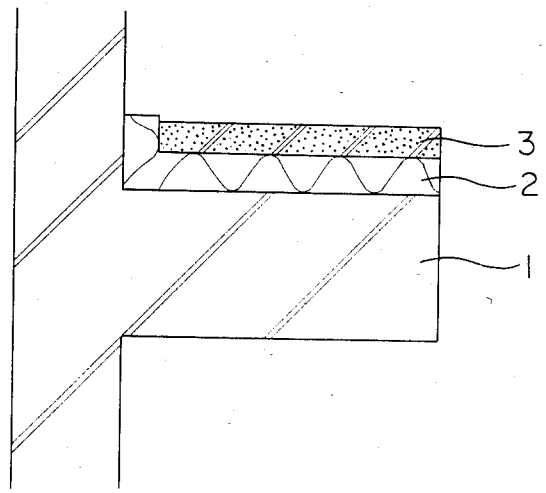
FIG. 2 is a diagram showing an example of the floating floor construction method.
Figure 3:
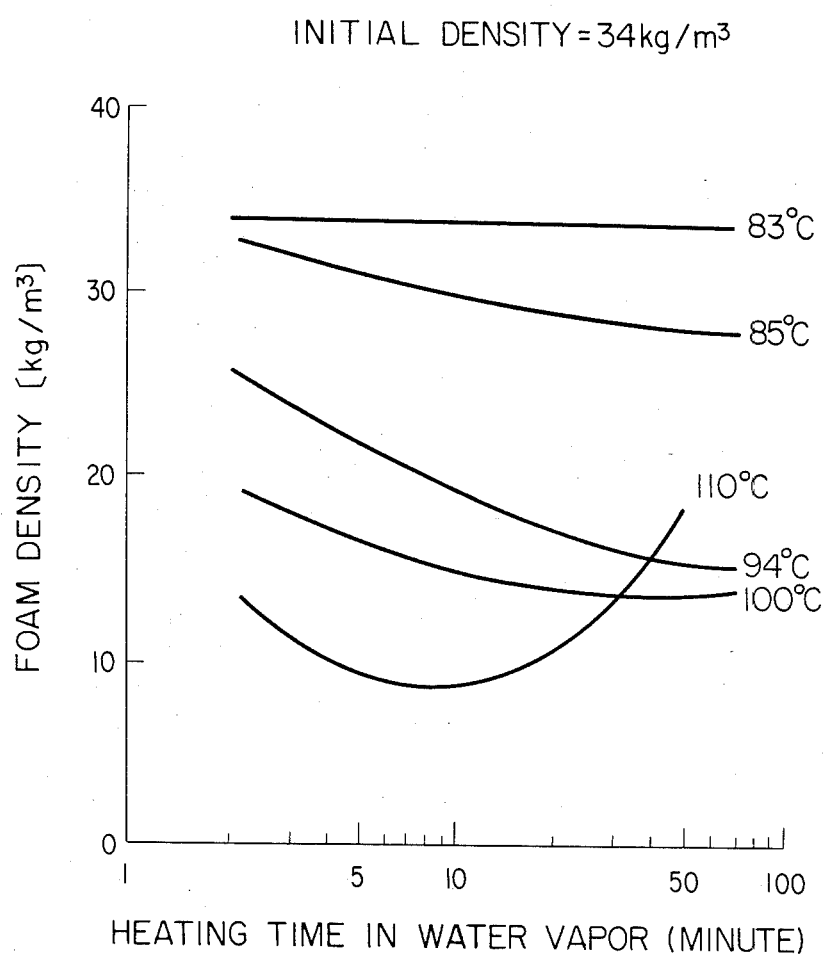
FIG. 3 is a graph showing the state of reduction of the density of the foam by heating and blowing.
Figure 4:
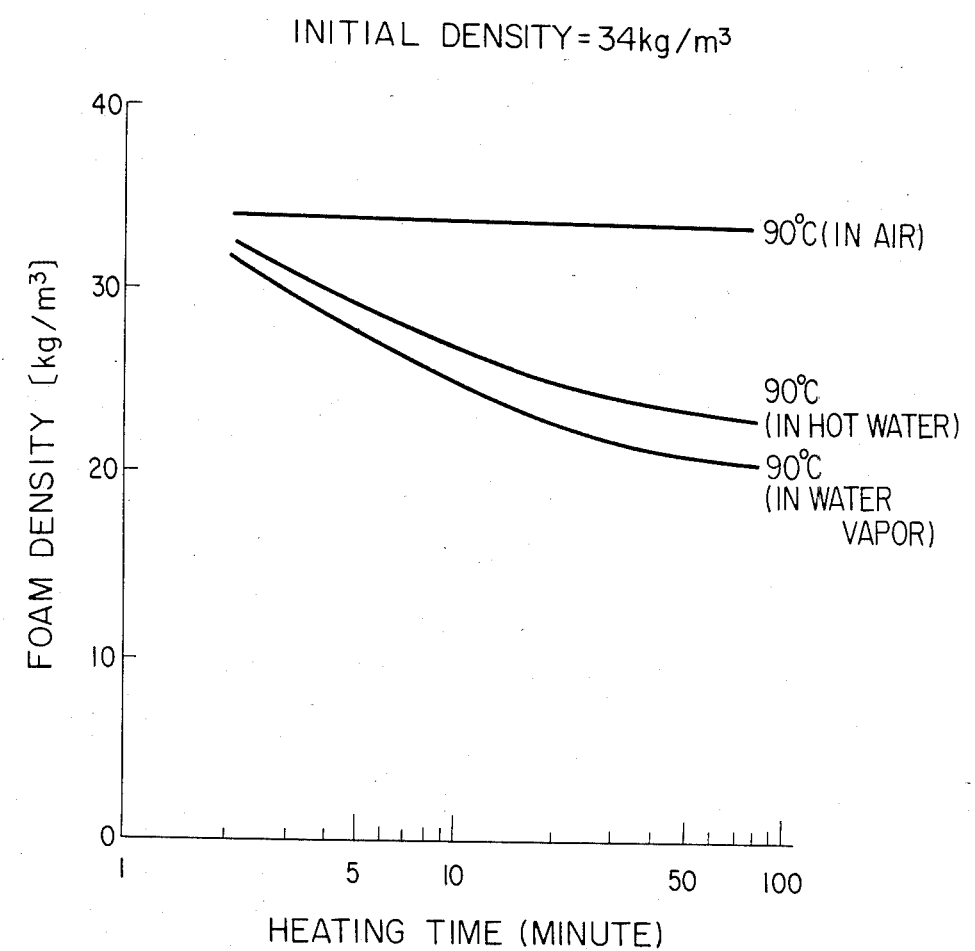
FIG. 4 is a graph showing the state of reduction of the density in various heating media.
Figure 5A:
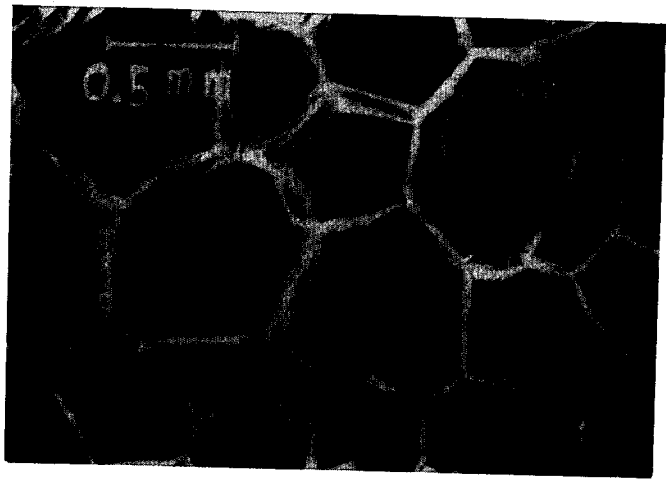
FIG. 5-(a) is an enlarged photograph showing the cellular structure of the product of the present invention.
Figure 5B:
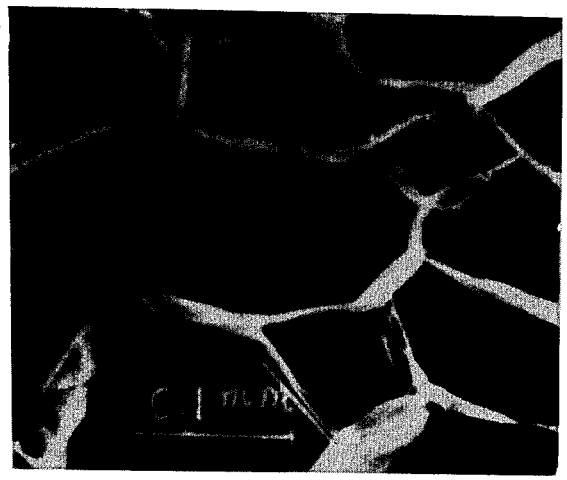
Figure 6:
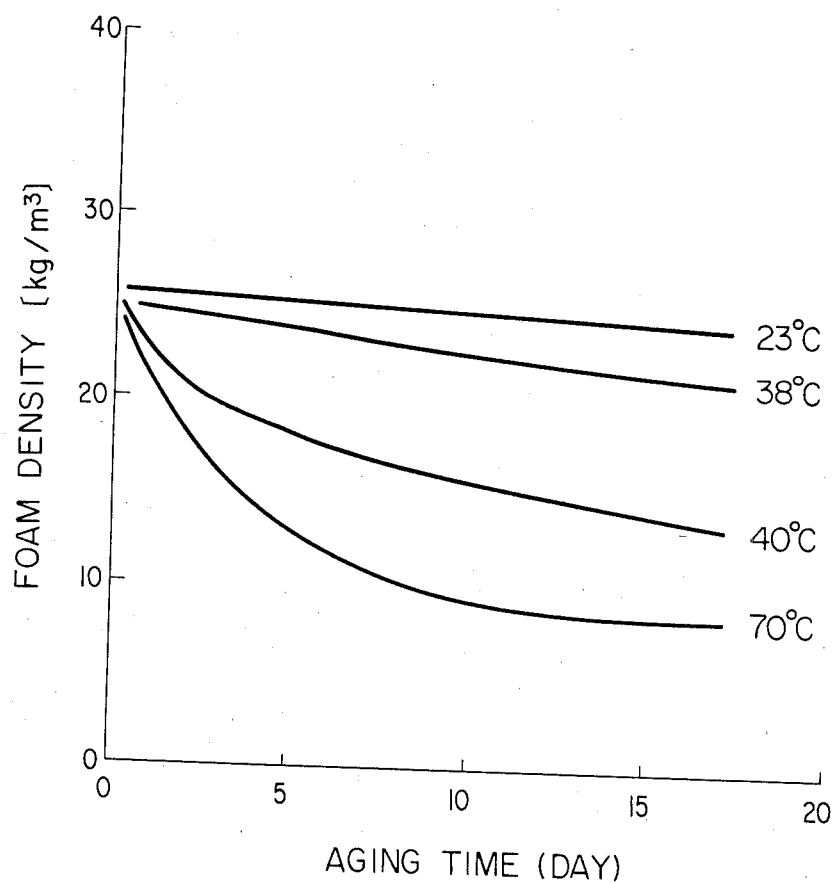
FIG. 6 is a graph showing the recovery state of the foam at various aging temperatures.
Figure 7:
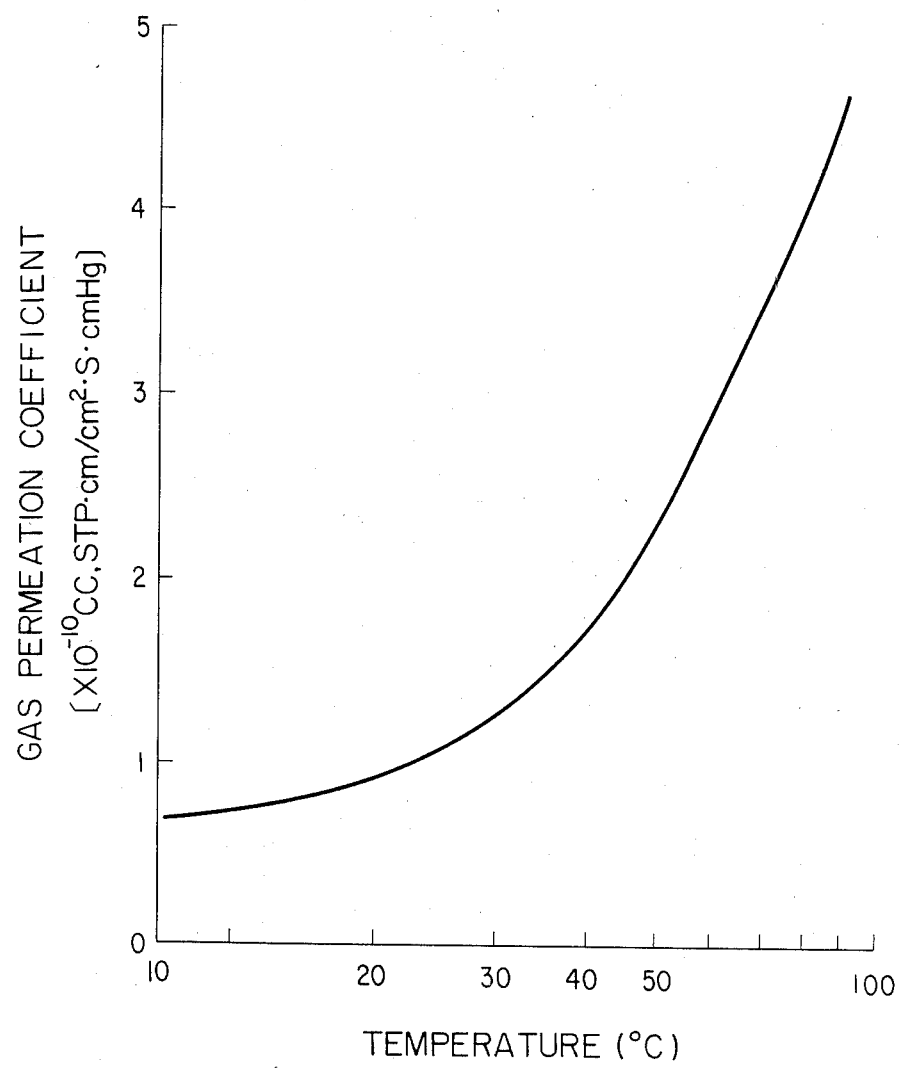
FIG. 7 is a graph showing an example of the temperature dependency of permeation of water vapor through a polystyrene wall.
Figure 8:
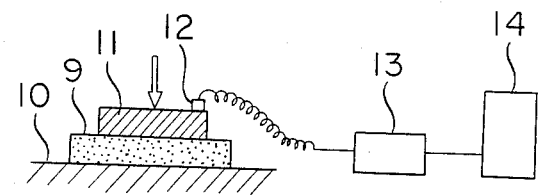
FIG. 8 and FIG. 9 are diagrams illustrating the method for measuring the kinetic spring constant.
Figure 9:
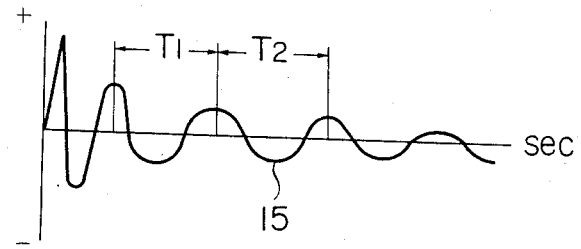

We claim:

1. A foam obtained by foaming a rigid thermoplastic resin, said foam having a density (D) of $3 \text{ Kg/m}^3 \leq D \leq 17 \text{ Kg/m}^3$, a multi-cellular structure including many wrinkles having one end in the boundary portion where at least 3 cells are adjacent to one another and extending toward the central portion of the cell wall, an average cell diameter (A) of $A \leq 2.0$ mm, a closed cell ratio (B) of $B \geq 50\%$, a kinetic spring constant (K) of $K \leq 40 \times 10^6 \text{N/m}^3$, and a minimum value (C), among 60% compression set values determined with respect to three directions rectangular to one another, of $C \leq 25\%$.

* * * * *

UNITED STATES PATENT AND TRADEMARK OFFICE
CERTIFICATE OF CORRECTION

PATENT NO. : 4,552,904
DATED : November 12, 1985
INVENTOR(S) : Takao KADOTA et al Page 1 of 5

It is certified that error appears in the above-identified patent and that said Letters Patent is hereby corrected as shown below:

Column 1, line 16, "head" should read --heat--.
Column 3, line 21, "may" should read --many--.
Column 5, line 64, thatreduction" should read --that reduction--;
    lines 67 and 68, "indispensible" should read --indispensable--.
Column 8, line 53, "AT" should read --At--.
Column 9, line 5, the title should read --I. SHOCK-ABSORBING PROPERTY--;
    lines 16 to 21, the table shoud read --

| 60% Compression Set (C) (%) | Mark |
|---|---|
| $15 \geq C$ | ◎ |
| $15 < C \leq 25$ | ○ |
| $25 < C$ | X |

--;

Column 9, lines 39 to 44, the table should read --

| Maximum Deceleration Rate (G) | Mark |
|---|---|
| $40 \geq G$ | ◎ |
| $40 < G \leq 60$ | ○ |
| $60 < G$ | X |

--;

Column 9, lines 59 to 64, the table should read --

| Compression Stress (Kg/cm$^2$) under 10% Strain | Mark |
|---|---|
| $1 \geq P$ | ◎ |
| $1 < P \leq 2$ | ○ |
| $2 < P$ | X |

--.

UNITED STATES PATENT AND TRADEMARK OFFICE
CERTIFICATE OF CORRECTION

PATENT NO. : 4,552,904
DATED : November 12, 1985
INVENTOR(S) : Takao KADOTA et al It is certified that error appears in the above-identified patent and that said Letters Patent is hereby corrected as shown below:

Column 10, lines 16 to 21, the table should read --

| Maximum Deflection | Mark |
|---|---|
| $20 \leq y$ | ◎ |
| $20 > y \geq 10$ | ○ |
| $10 > y$ | X |

--;

Column 10, lines 31 to 36, the table should read --

| Heat Conductivity (Kcal/m · hr°C) | Mark |
|---|---|
| $0.033 \geq \lambda$ | ◎ |
| $0.033 < \lambda \leq 0.043$ | ○ |
| $0.043 < \lambda$ | X |

--;

Column 10, lines 49 to 54, the table should read --

| Temperature Gradient of Heat Conductivity | Mark |
|---|---|
| $2.7 \times 10^{-4} \geq X$ | ◎ |
| $2.7 \times 10^{-4} < X \leq 3.3 \times 10^{-4}$ | ○ |
| $3.3 \times 10^{-4} < X$ | X |

--.

Column 11, lines 39 to 44, the table should read --

| Class of Sound-insulating Effect | Mark |
|---|---|
| above leve L-50 | ◎ |
| below level L-50 but above level L-60 | ○ |
| below level L-60 | X | line 50, "Table 1-1" should read --Table 1--.
Column 12, line 2, "Table 1-2 and Table 1-3" should read --Table 1--;

UNITED STATES PATENT AND TRADEMARK OFFICE
CERTIFICATE OF CORRECTION

PATENT NO. : 4,552,904
DATED : November 12, 1985
INVENTOR(S) : Takao KADOTA et al It is certified that error appears in the above-identified patent and that said Letters Patent is hereby corrected as shown below:

Column 12, line 45, "Table 2-1" should read --Table 2--;
    line 49 and 50, "Table 2-2 and Table 2-3" should read --Table 2-- and "Table 2-1" should read --Table 2--.
Columns 11 and 12, Table 1, the last section entitled "Evaluation items" should read as follows:

| -- Shock-absorbing property (1)(%) | 15 | 23 | 23 | 14 | 25 | 21 | 27 | 30 | 34 | 24 | 32 |
|---|---|---|---|---|---|---|---|---|---|---|---|
|  | ◎ | ○ | ○ | ◎ | ○ | ○ | X | X | X | ○ | X |
| Shock-absorbing property (2) | ◎ | ◎ | ◎ | ◎ | ○ | ◎ | ○ | ○ | X | ○ | ○ |
| Shock-absorbing property (3) | ◎ | ○ | ○ | ◎ | ○ | ○ | ○ | X | X | ○ | X |
| Bending deflection | ◎ | ○ | ○ | ○ | ○ | ○ | X | X | X | X | X |
| Heat insulating property (1) | ◎ | ◎ | ◎ | ○ | ◎ | ◎ | ◎ | ◎ | ◎ | ○ | X |
| Heat insulating property (2) | ○ | ○ | ◎ | ○ | ◎ | ○ | ○ | ◎ | ◎ | ○ | ◎ |
| Sound insulating property | ◎ | ○ | ◎ | ○ | ○ | ○ | X | X | X | X | X -- |

Column 13, line 67, "Table 3-1" should read --Table 3--;
    line 67, "Table 3-2 and Table 3-3" should read --Table 3--.
Columns 13 and 14, Table 2 - continued, the last section entitled "Evaluation items" should read as follows:

| -- Shock-absorbing property (1)(%) | 5.7 | 8.0 | 10.2 | 7.7 | 24 | 8.5 | 10.0 | 25 | 40 |
|---|---|---|---|---|---|---|---|---|---|
|  | ◎ | ◎ | ◎ | ◎ | ○ | ◎ | ◎ | X | X |
| Shock absorbing property (2) | ◎ | ◎ | ◎ | ◎ | ○ | ◎ | ◎ | ○ | X |
| Shock absorbing property (3) | ◎ | ◎ | ◎ | ◎ | ○ | ◎ | ◎ | ○ | X |
| Bending deflection | ◎ | ◎ | ◎ | ◎ | ○ | ◎ | ○ | X | X |
| Heat insulating property (1) | ○ | ○ | ○ | ○ | ◎ | X | X | ○ | ◎ |
| Heat insulating property (2) | ○ | ○ | ○ | ○ | ◎ | X | X | ○ | ◎ |
| Sound insulating property | ◎ | ◎ | ◎ | ◎ | ◎ | ◎ | ○ | X | X --; |

UNITED STATES PATENT AND TRADEMARK OFFICE
CERTIFICATE OF CORRECTION

PATENT NO. : 4,552,904
DATED : November 12, 1985
INVENTOR(S) : Takao KADOTA et al Page 4 of 5

It is certified that error appears in the above-identified patent and that said Letters Patent is hereby corrected as shown below:

Columns 13 and 14, Table 3, the last section entitled "Evaluation items" should read as follows:

--Shock-absorbing property (1) (%)    15   10.0  22   17.0  7.0  24   23   26   26 - 30   31
                                       ◉    ◉    ○    ○    ◉    ○    ○    X    X  -  X    X
Shock-absorbing property (2)           ◉    ◉    ○    ◉    ◉    ○    ○    ○    ○  -  X    X
Shock-absorbing property (3)           ◉    ◉    ◉    ◉    ◉    ○    ○    ○    X  -  X    X
Bending deflection                     ◉    ○    ○    ○    ◉    ○    ○    X    X  -  X    X
Heat insulating property (1)           ○    ○    ◉    ◉    ○    ○    ○    ◉    ○  -  ○    X
Heat insulating property (2)           ○    ○    ◉    ○    ○    ◉    ◉    ◉    ○  -  ◉    ○
Sound insulating property              ◉    ◉    ○    ◉    ◉    ○    ○    X    ○  -  X    X
--.

Column 15, lines 3 and 4, "Table 4-1 and Table 4-2" should read --Talbe 4--.

Columns 15 and 16, Table 4, the lase section entitled "Evaluation items" should read as follows:

-- Product No. 1 of          15    38    0.7   22    0.033   2.8
   present invention         ◉     ◉     ◉     ◉     ◉       ○     ◉
   Product No. 15 of         7.7   35    0.5   30    0.035   3.0
   present invention         ◉     ◉     ◉     ◉     ○       ○     ◉
   Product No. 22 of         22    44    0.9   12    0.032   2.4
   present invention         ○     ○     ◉     ○     ◉       ◉     ○
   Commercial                3.0   —     —     —     0.038   100
   product S                 ◉     X     ◉     ◉     ○       X     ◉
   Commercial                42    —     5.0   2     0.032   2.5   X
   product W                 X     X     X     X     ◉       ◉
   Commercial                38    75    3.5   3.8   0.029   1.3   X
   product X                 X     X     X     X     ◉       ◉
   Commercial                40    80    3.5   3.2   0.029   1.7   X
   product Y                 X     X     X     X     ◉       ◉
   Commercial                27    70    2.4   5.3   0.034   2.9   X
   product Z                 X     X     X     X     ◉       ○          --.

UNITED STATES PATENT AND TRADEMARK OFFICE
CERTIFICATE OF CORRECTION

PATENT NO. : 4,552,904

DATED : November 12, 1985

INVENTOR(S) : Takao KADOTA et al

It is certified that error appears in the above-identified patent and that said Letters Patent is hereby corrected as shown below:

Claim 1, line 3, "multi:cellular" should read --multi-cellular--.

Signed and Sealed this

Twenty-third Day of December, 1986

Attest:

DONALD J. QUIGG

Attesting Officer

Commissioner of Patents and Trademarks